US008726856B2

(12) United States Patent
Terry

(10) Patent No.: US 8,726,856 B2
(45) Date of Patent: May 20, 2014

(54) INTERNAL COMBUSTION ENGINE

(76) Inventor: Stephen Richard Terry, Wirral (GB)

( * ) Notice: Subject to any disclaimer, the term of this patent is extended or adjusted under 35 U.S.C. 154(b) by 398 days.

(21) Appl. No.: 13/054,255

(22) PCT Filed: Jul. 15, 2009

(86) PCT No.: PCT/GB2009/050858
§ 371 (c)(1),
(2), (4) Date: Apr. 11, 2011

(87) PCT Pub. No.: WO2010/007429
PCT Pub. Date: Jan. 21, 2010

(65) Prior Publication Data
US 2011/0180050 A1 Jul. 28, 2011

(30) Foreign Application Priority Data
Jul. 15, 2008 (GB) .................................. 0812891.0

(51) Int. Cl.
*F01B 3/00* (2006.01)
*F02B 75/18* (2006.01)
*F02B 75/22* (2006.01)

(52) U.S. Cl.
USPC .... 123/45 R; 123/45 A; 123/50 R; 123/50 A; 123/50 B; 123/52.1; 123/54.1; 123/54.2; 123/54.3; 123/55.2; 123/55.3

(58) Field of Classification Search
USPC ....... 123/45 R, 45 A, 50 R, 50 A, 50 B, 52.1, 123/54.1, 54.2, 54.3, 55.2, 55.3
See application file for complete search history.

(56) References Cited

U.S. PATENT DOCUMENTS

| 1,597,474 | A | * | 8/1926 | Nordwick et al. | ............ | 123/54.3 |
| 1,630,273 | A | * | 5/1927 | Nordwick | .................. | 123/197.1 |
| 1,795,865 | A | * | 3/1931 | Kettering | ..................... | 123/54.3 |
| 1,904,680 | A | * | 4/1933 | Ferry | ............................... | 74/55 |

(Continued)

FOREIGN PATENT DOCUMENTS

| FR | 961284 | | 5/1950 |
| FR | 961284 | A * | 5/1950 |
| JP | 8004553 | A | 1/1996 |
| WO | 9724518 | A1 | 7/1997 |

OTHER PUBLICATIONS

International Search Report dated May 18, 2010, issued in connection with PCT Application No. PCT/GB2009/050858.

*Primary Examiner* — Lindsay Low
*Assistant Examiner* — Charles Brauch
(74) *Attorney, Agent, or Firm* — Ronald E. Prass, Jr.; Prass LLP

(57) ABSTRACT

An Otto cycle, Atkinson cycle or supercharged internal combustion engine (10) and a timing mechanism therefor. The engine comprising: a cylinder (14) and a piston (12) reciprocally mounted within the cylinder (14) in which reciprocating movement of the piston is converted into rotational movement of an output shaft (28) by way of rollers (20, 24) engaging primary (22) and secondary (26) cam means which are affixed to, and rotatable with, the output shaft (28). The timing mechanism comprising cam means (52, 53) mounted on, and rotatable in unison with, the output shaft (28), a cam follower (54, 55) arranged to engage the cam means (52) and a linkage connecting the cam follower to a pivoting rocker arm for actuating the engine's induction and exhaust valves, the rocker arm pivot being adapted to be moveable on an arcuate locus centered on the axis of the output shaft (28).

14 Claims, 14 Drawing Sheets

(56) References Cited

U.S. PATENT DOCUMENTS

| | | | |
|---|---|---|---|
| 1,931,401 A * | 10/1933 | Baisden | 74/55 |
| 2,232,305 A * | 2/1941 | Bakewell | 123/54.2 |
| 3,124,115 A * | 3/1964 | Voorhies | 123/90.55 |
| 3,572,209 A * | 3/1971 | Aldridge | 91/188 |
| 3,757,748 A * | 9/1973 | Arney | 123/45 A |
| 4,114,588 A * | 9/1978 | Jordan | 123/198 F |
| 4,334,506 A * | 6/1982 | Albert | 123/51 B |
| 4,512,291 A * | 4/1985 | Kirk | 123/54.2 |
| 2003/0024493 A1 * | 2/2003 | Beierle | 123/54.3 |
| 2007/0079790 A1 | 4/2007 | Pattakos et al. | |

\* cited by examiner

INTERNAL COMBUSTION ENGINE

CROSS REFERENCE TO RELATED APPLICATION

This application is a National Stage entry of International Application No. PCT/GB2009/050858, filed Jul. 15, 2009, which claims priority from GB Application No. 0812891.0, filed Jul. 15, 2008, the entire specification, claims and drawings of which are incorporated herewith by reference.

This invention relates to internal combustion engines. In particular, this invention relates to crankless internal combustion engines and variable valve timing mechanisms for an internal combustion engines.

A conventional internal combustion engine comprises a piston that reciprocates within a cylinder, which reciprocating movement is converted to rotational output via a rigid linkage (connecting rod) pivotally connected between the piston and a crankshaft.

A conventional internal combustion engine is relatively inefficient for a number of reasons, namely that:

The power stroke begins when the piston is at top dead centre (TDC), i.e. when the piston is at its furthest point from the crankshaft and when the longitudinal axis of the connecting rod is aligned with the crankshaft. However, linear movement of the piston is converted to rotational movement of the crankshaft most efficiently when the piston is halfway between TDC and bottom dead centre (BDC) i.e. when the connecting rod acts with the greatest leverage against the crankshaft.

Because of the fixed geometry of the connecting rod and crankshaft, the ignition and exhaust strokes are of equal lengths and the compression ratio is effectively fixed. However, maximum efficiency is obtainable only where the exhaust stroke is shorter than the power stroke, and where the compression ratio can be tuned to a particular fuel type.

Internal combustion engines exist which exploit the "Atkinson cycle", in which the power/ignition and exhaust strokes are of different lengths. However, these engines are costly to produce due to the complex nature of the internal mechanism required to obtain the requisite unequal stroke lengths.

This invention aims to provide a solution to one or more of the above problems and/or to provide an alternative to a cranked internal combustion engine.

According to a first aspect of the invention there is provided an internal combustion engine comprising a cylinder, a piston reciprocally mounted within the cylinder, a connecting rod extending from the piston and two spaced-apart rollers mounted on the connecting rod, wherein a first one of the rollers is adapted to engage primary cam means and a second one of the rollers is adapted to engage secondary cam means, the primary and secondary cam means being affixed to, and rotatable with, a common output shaft.

In an engine according to the invention, linear movement of the piston can be transferred to the first roller via the connecting rod, which movement can be accommodated by the first roller rolling over the surface of a lobe of the primary cam means causing the cam means and the output shaft to rotate. The linear movement may be caused by combustion of air/fuel mixture within the cylinder.

Rotational movement of the cam means may be converted to linear movement of the piston by the first roller rolling up an exhaust lobe of the primary cam means. The linear movement may force exhaust products out of the cylinder via an exhaust valve.

The piston may be moveable linearly by the action of the second roller rolling up an induction lobe of the secondary cam means. The linear movement may create a partial vacuum within the cylinder which vacuum is used to draw a fuel/air mixture into the cylinder.

Rotation of the output shaft may be converted to linear movement of the piston by the first roller rolling over a compression lobe of the primary cam means. The linear movement may cause fuel/air mixture in the cylinder to be compressed ready for a power stroke.

The position of the piston therefore depends on the rotational orientation of the output shaft or vice-versa. By replacing the crankshaft of a conventional internal combustion engine with the cams and bearings of the present invention, it becomes possible to tailor, either spatially and/or temporally, the conversion of reciprocating movement of the piston into rotational movement of the output shaft, or vice-versa, by the careful selection of cam geometry.

In particular, by varying the heights of the cam lobes, the spatial relationship between reciprocating piston movement and shaft rotation, i.e. the stroke lengths, can be varied. Thus, it becomes possible, for example, through careful selection of cam geometry, to have different compression ratios on the exhaust and compression strokes.

Additionally or alternatively, by varying the gradients of the cam lobe edges, the temporal relationship between reciprocating piston movement and shaft rotation, i.e. the time it takes to complete each stroke of the cycle, can be varied. For example, by making the leading edge of the compression/power stroke lobe steeper than the trailing edge, compression can take place more quickly and the power stroke can be of increased duration to obtain faster, and hence, hotter compression and an increased amount of fuel burning through the power stroke.

In a preferred embodiment of the invention, the primary cam is used for converting linear movement of the piston into rotational movement of the output shaft, whereas the secondary cam is used for converting rotational movement of the output shaft into linear movement of the piston. This may, however, be reversed without detriment.

The primary cam may comprise any plurality of lobes, although for a four-stroke or six-stroke cycle, four or six lobes, respectively, are preferably provided. Advantageously, by providing four lobes in a four-stroke cycle engine, a single, un-geared desmodromic valve cam can be used. Additionally, a four-lobed cam is more easily balanced where the heights of the lobes are unequal, e.g. in an Atkinson cycle or supercharged engine.

Due to the way that the temporal and spatial relationship between piston reciprocation and shaft rotation can be tailored by cam geometry design and selection, the invention is particularly suited to unconventional engine regimes. For example, by providing cams having integer multiples of three lobes, it is relatively straightforward to adapt the engine to run using a six-stroke cycle. Six-stroke engine cycles are relatively well-known, and generally comprise six strokes, namely induction, compression, ignition, exhaust, water injection and a steam power stroke. Moreover, the invention is not limited to having equal stroke lengths (compression ratios) or durations for all strokes of the six-stroke cycle, which can lead to considerable inefficiency and/or power gains.

Where the primary cam comprises two lobes, one complete rotation of the output shaft is required per four-stroke cycle (i.e. induction, compression, ignition/power, exhaust) of the engine. However, in the preferred embodiment of the invention, where the primary cam comprises four-lobes, only half of one complete rotation of the output shaft is required per four-stroke cycle. Where the primary cam comprises six or eight lobes, only one-third or a quarter of a complete rotation of the output shaft is required per four stroke cycle, respectively, and so on. In the case where the engine is configured to operate using a two-stroke cycle, a four-lobed primary cam would effect four two-stroke cycles per complete rotation of the output shaft. The relationship between the output shaft speed and the piston frequency can therefore be changed by the appropriate selection of cam geometry, i.e. the number of lobes per cam.

The stroke length and duration is a function of the primary and secondary cam shapes, which are interrelated. In a preferred embodiment of the invention, the height of the lobes of the primary cam defines the power stroke length and the height of the lobes of the secondary cam defines the exhaust stroke length. Since the power and exhaust stroke lengths are defined by different cams, it is possible to choose between having equal or unequal exhaust and power strokes. Thus, the engine can be made more thermodynamically efficient by choosing a power stroke that is longer than the exhaust stroke (i.e. an Atkinson cycle), or more powerful by opting to make the exhaust stroke longer than the power stroke (i.e. super charged).

According to a second aspect of the invention there is provided an internal combustion engine comprising a cylinder, a piston reciprocally mounted within the cylinder, a connecting rod extending from the piston for converting reciprocating movement of the piston into rotational movement of an output shaft, and at least one valve for controlling the ingress and/or egress of a fluid into the cylinder, the valve being actuated by a linkage carrying a pair of cam followers cooperating with the surfaces of primary and secondary valve cam means which rotate with the output shaft, wherein the surface of the primary valve cam means comprises a generally circular portion and a pair of protrusions, and the surface of the secondary valve cam means comprises a generally circular portion and a pair of indentations, a first one of the cam followers cooperating with the surface of the primary valve cam means and a second one of the cam followers cooperating with the surface of the secondary valve cam means, which protrusions and indentations cause the valve to open or close respectively as the cam followers roll thereover, characterised by a stepped transition between the generally circular portion and the protrusion and/or indention of the valve cams.

The first and second aspects of the invention can be combined in a single engine.

Preferably, the transition from the generally circular portion to the protrusion or indention takes place within less than a few degrees of rotation of the valve cam, preferably less than five degrees, and most preferably within less than one degree of rotation.

Additionally or alternatively to the foregoing, it is often desirable for an engine to have so-called "variable valve timing", or "VVT", which enables the injection of fuel into the cylinder to be advanced or retarded with respect to top-dead-centre (TDC) of the engine cycle, or the expulsion of combustion products to be advanced or retarded with respect to bottom-dead-centre (BDC) of the engine cycle.

The efficiency and/or power of an internal combustion engine can sometimes be improved by varying the engine's valve timing. In a conventional engine, the induction valve will open at a fixed point in time shortly after the piston begins its downward movement in the induction stroke. Similarly, the exhaust valves will open at a fixed point in the cycle shortly after the piston begins its upward movement in the exhaust stroke. However, when the engine is being driven hard (e.g. during acceleration) or when idling (e.g. in overrun), it can be advantageous, from an efficiency or power point of view, to advance or retard the timing of the opening or closing of the valves.

When the valve timing is advanced, the valves are opened or closed shortly before they would ordinarily do so, and conversely, when retarded, they open or close shortly after they would normally do so. The effect of advancing or retarding the valve timing is to temporally shorten or lengthen the power or exhaust strokes.

In practice, in a conventional engine, the timing can be advanced or retarded by interfering with the connection between the cam belt and rocker arm to introduce or remove a delay such that the valves are actuated ahead of time or in a delayed fashion to obtain an "advance" or "retardation" of the timing, respectively.

One known type of VVT mechanism comprises a system of gears associated with the cam belt that introduces a delay of known duration into the engine timing. By setting the timing up to be advanced by default, varying the timing delay between zero and a pre-set maximum enables the engine timing to be advanced (if the delay is less than the default advance), neutral (if the delay is equal to the default advance) or retarded (if the delay is greater than the default advance). A similar effect can be obtained using a hydraulic system in which an adjustable accumulator is used to delay the actuation of the hydraulically-actuated tappets.

A major drawback of known VVT systems, however, is their inherent complexity, which increases manufacturing and maintenance costs and can lead to reliability issues. This invention aims to provide a solution to one or more of the above problems and/or to provide an alternative to known VVT mechanisms.

According to a third aspect of the invention there is provided a timing mechanism for an internal combustion engine, said internal combustion engine comprising an output shaft, and the timing mechanism comprising: a cam means mounted on, and rotatable with, the shaft; a cam follower arranged to engage the cam means; a linkage connected at one end to the cam follower and at the other end to a rocker arm; said rocker arm being pivotally connected to a pivot means and being adapted to actuate an induction or exhaust valve of the engine; wherein; the pivot means is slidingly moveable on an arcuate locus, which locus is centred on the axis of the shaft such that movement of the pivot means along the arcuate locus advances or retards the timing of the engine.

The cam means may be rotatable in unison with the engine's output shaft, or may be geared to rotate at half the speed of the output shaft.

This invention may be particularly suited to use in a cam engine, such as that described above, which describes an engine in which reciprocating piston movement is converted to rotational shaft movement using an arrangement of cams and rollers rather than a conventional crank assembly. In such an engine or a two-stroke engine, one complete revolution of the engine's output shaft corresponds to four strokes of the Otto cycle. Thus, the cam means can be rigidly affixed to the output shaft such that it rotates in unison therewith.

Nevertheless, the present invention can be used in conjunction with a conventional engine in which two complete revolutions of the output shaft correspond to the four strokes of the Otto cycle. In such a case, the cam means can be geared such that it rotates at half the speed of the engine's output shaft.

Furthermore, the present invention is compatible with other engine regimes, e.g. a six-stroke cycle engine, in which case the cam means would be geared to rotate at one-third of the engine's output shaft speed.

In the present invention the rocker arms, and hence the valves, are actuated directly by the timing cam means, as compared to a known VVT system in which they are actuated indirectly, for example using a cam belt or a hydraulic system.

Because the engine timing is dictated by the position of the pivot point on the arcuate locus, it is possible to vary the timing in infinitely small increments. Moreover, since the length of the locus is, in principle, unlimited, the present invention permits much larger timing changes that can be obtained using a known VVT system.

The pivot means is preferably adapted to allow movement of the rocker arms in a plurality of planes, for example pivoting and rotation of the rocker arm. This can be achieved by providing a ball and socket joint about which the rocker arms are able to pivot and rotate. The rocker arms are preferably connected to the pivot point, linkage and/or valve tappet using ball and socket joints.

The rocker arms are preferably telescopically extendible to accommodate changes in distance between the end of the linkage and the valve tappet as the rocker arm is rotated and/or pivoted.

The arcuate locus along which the pivot means is moveable may be defined by an arcuate slot or track in or on which the pivot means is slideably moveable. In a preferred embodiment of the invention the pivot means is mounted on a pinion gear that is free to roll along an arcuate rack. In such a case there is a direct relationship between the amount of rotation of the pinion gear and the amount of timing advance or retardation.

The linkage may comprise a substantially rigid rod. The linkage is preferably constrained to reciprocate axially along a straight locus that intersects the axis of the engine's output shaft. The linkage may be retained in linear bushes located on opposite sides of the engine's output shaft.

The cam follower may comprise a roller or ball bearing that is arranged to engage an edge of the cam means. A plurality of cam followers may be provided. In a preferred embodiment of the invention the cam follower comprises a pair of rollers or ball bearings arranged to engage diametrically opposite portions of the edge of the cam means. Such an arrangement enables the linkage to operate desmodromically so that the engines valves are opened and closed directly, rather than being operated against a biasing means, such as a spring. Such an arrangement can give rise to more precise control of the valves and removes the necessity for the timing mechanism to work against the force of spring. This can mean that the timing components can be made less robustly for a given operating life/conditions.

Preferred embodiments of the invention shall now be described, by way of example only, with reference to the accompanying drawings in which.

For ease of understanding, features common to all embodiments of the invention described herein are identified using identical reference numerals.

Figure 1:
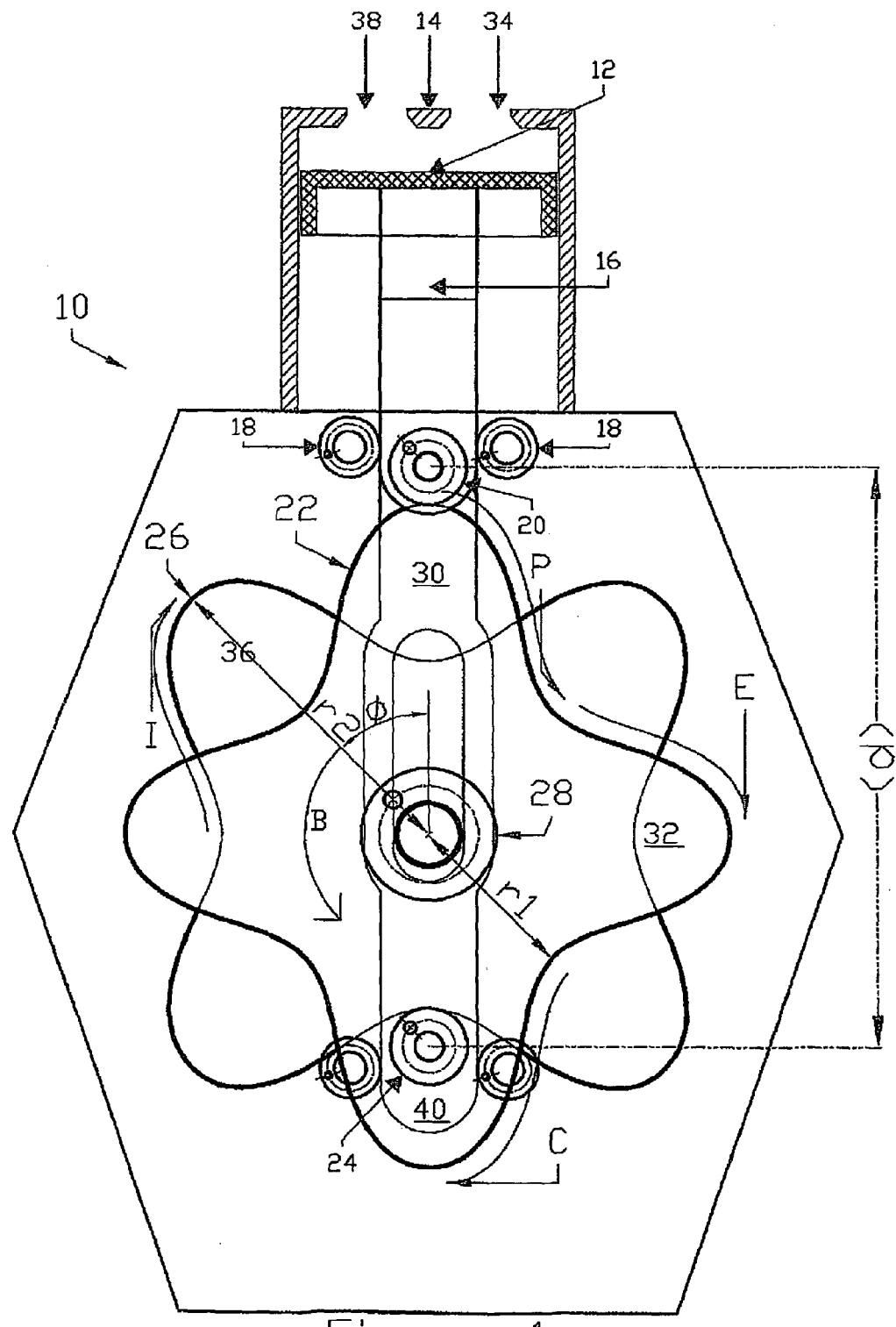
FIG. 1 is a schematic end view of an embodiment of a single-cylinder Atkinson cycle engine according to the invention at top dead centre, prior to the power stroke.

Referring to FIGS. 1 to 4 of the accompanying drawings, a single-cylinder Atkinson cycle engine 10 comprises a piston 12 that is arranged to reciprocate within a cylinder 14. A connecting rod 16 is used for converting reciprocating movement of piston 12 into rotational movement of the output shaft 28 using cam followers/leaders (hereinafter "rollers") 20, 24 that cooperate with the outer edges of a primary cam 22 and a secondary cam 26. The rollers 20, 24 are depicted herein as being ball races, although any low friction, load bearing means capable of cooperating with the cams could be used, e.g. a ball bearing, a wheel, a slider, a roller, a race etc.

In each case, the connecting rod 16 is rigidly affixed to the centre of, and extends downwardly from, the underside of the piston 12 and is further constrained to move only parallel to the axis of the cylinder 14 by a set of guide rollers 18 located at the base of the cylinder 14 and bearing on opposite sides of the connecting rod 16. By constraining the movement of the connecting rod 16, forces from the piston 12 are always transferred to the connecting rod 16 parallel to the axis of the cylinder 14, i.e. without a sideward component (in contrast to the case where the connecting rod is pivotally connected to the piston), which reduces wear of the piston rings (not shown).

The connecting rod 16 carries a first bearing in the form of a roller 20, mounted at a point on the connecting rod 16 immediately below the guide rollers 18 when the piston 12 is at top dead centre. The first roller 20 is arranged to engage the edge of a primary cam 22.

The connecting rod 16 also carries a second bearing in the form of a second roller 24 located at the end of the connecting rod 16. The second roller 24 is arranged to engage the edge of a secondary cam 26.

Each of the primary 22 and secondary cams 26 has four lobes, whose shapes define how reciprocating movement of the piston 12 is converted into rotational movement of an output shaft 28, to which both cams 22, 26 are rigidly affixed, at their centre points. Primary cam 22 is generally cruciform in shape with elongate lobes, opposite lobes being identical. Secondary cam 26 is also generally cruciform in shape with more rounded, petal-shaped lobes, opposite lobes being identical.

The shape of the outer edge of the primary cam 22 can be defined by a polar equation in which the distance from the axis of rotation (the centre of the shaft 28) to the edge of the primary cam $r_1$ is a function of the angle θ of rotation. In other words, the shape of the primary cam 22 can be defined by a function of the type $r_1 = f(\theta)$. Now, the distance d between the first 20 and second rollers 24 is fixed and both rollers remain in contact with their respective cams 22, 26 at all times. Therefore, the shape of the outer edge of the secondary cam 26 can also be defined by a polar equation in which the distance from the axis of rotation (the centre of the shaft 28) to the edge of the secondary cam $r_2$ is a function $r_1$. Thus, $r_2 = d - r_1 = d - \{f(\theta)\}$. In essence, therefore, since the primary 22 and secondary cam 26 shapes are intimately interrelated, the shape of the primary cam 22 directly defines how linear movement of the piston 12 during the power stroke is converted into rotational movement of the output shaft 28 and indirectly defines how rotational movement of the output shaft 28 is converted into linear movement of the piston 12 during the compression stroke.

Figure 5:
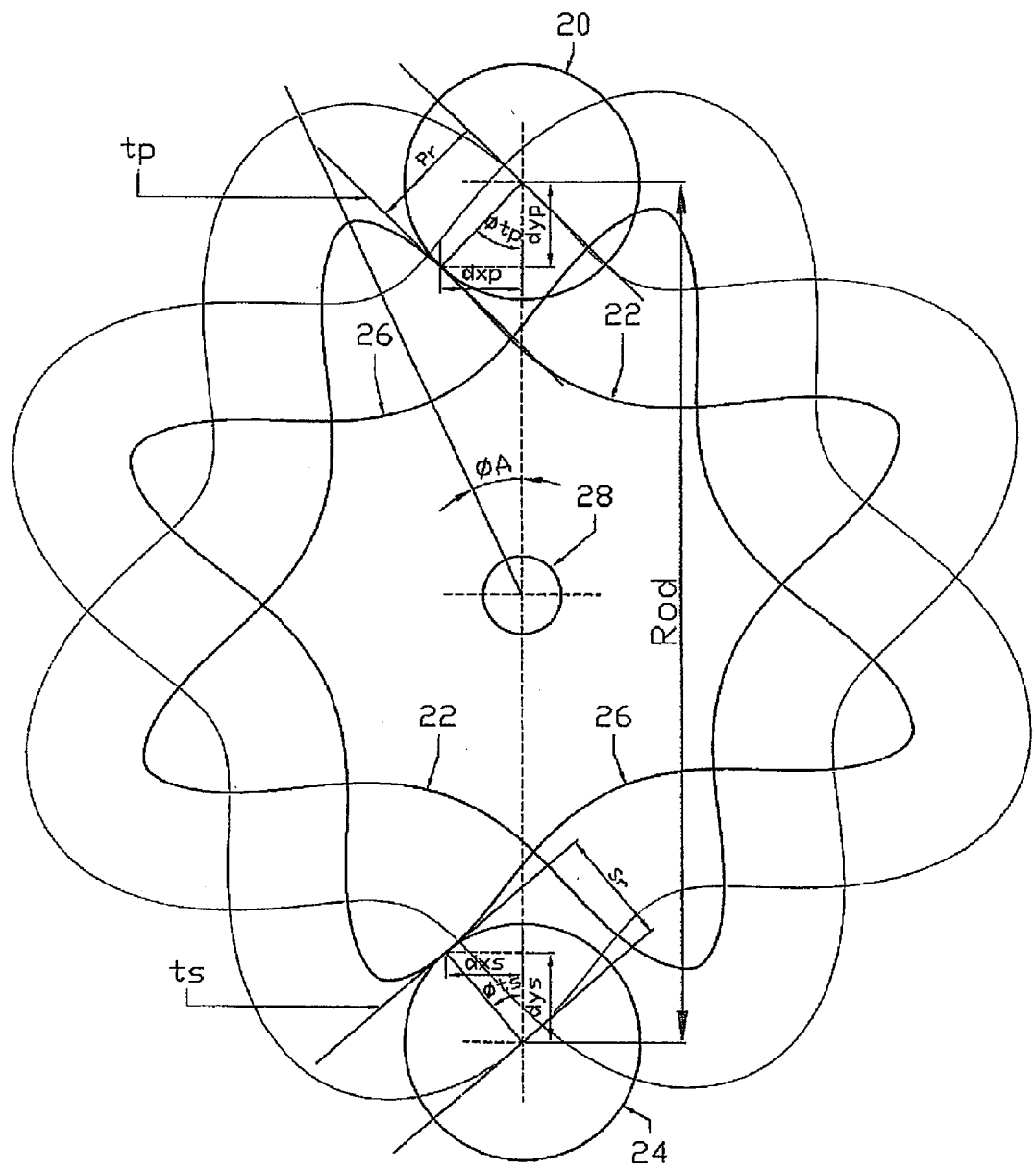
FIG. 5 is a diagram showing the geometrical relationship between the cam edges, the cam follower centres and the connecting rod.

FIG. 5 schematically illustrates the cam, roller and connecting rod geometry. A mathematical relationship between the three as a function of angle of output shaft rotation, where $Ø_A$ is the crank angle and $Ø_S$ is the stroke angle, can be determined as follows:

Taking the example of an Otto cycle engine in which the stroke angle for a sinusoidal movement is equivalent to a conventional crankshaft rotation with a piston. In this case, for a four lobed cam, $Ø_S = 4Ø_A$.

Points defining a circle for the Primary Cam and Secondary Cam relative to the Primary Roller centre and Secondary Roller centre R are:

$$X = R \cos Ø_A, \text{ and}$$

$$Y = R \sin Ø_A$$

For a given stroke:

$$Y_S = \cos Ø_S \left( \frac{\text{Stroke}}{2} \right)$$

Applying stroke components to the Cam radius:

$$X_P = X + Y_S \sin Ø_A \text{ and}$$

$$Y_P = Y + Y_S \cos Ø_A$$

Secondary Cam points, rollers connected length [ROD]:

$$X_S = X_P - (ROD \sin Ø_A) \text{ and}$$

$$Y_S = Y_P - (ROD \cos Ø_A)$$

Roller Radius Compensation: Tangent at roller centre is equal to tangent at cam contact point on roller circumference [dx/dy]. For any stroke profile the tangent angles $Ø_{tp}$ and $Ø_{ts}$ can thus be determined for primary cam $(x_p, y_p)$ and secondary cam $(x_s, y_s)$:

$$\frac{(X_{P1} - X_{P2})}{(Y_{P1} - Y_{P2})} = \frac{dxp}{dyp}, \text{ then}$$

$$Ø_{tp} = \tan^{-1} \frac{dxp}{dyp} \text{ and } Ø_{ts} = \tan^{-1} \frac{dxs}{dys}$$

Subtracting roller radius components from the profiles (Xp, Yp) and (Xs, Ys) gives the Primary Cam profile (Xpc, Ypc) and Secondary Cam profile (Xsc, Ysc) for each primary roller radius (Pr) and secondary roller radius (Sr).

$$X_{Pr} = X_P - (\sin(Ø_A + Ø_{tp}) \times Pr)$$

$$Y_{Pc} = Y_P - (\cos(Ø_A + Ø_{tp}) \times Pr)$$

$$X_{Sc} = X_S - (\sin(Ø_A + Ø_{ts}) \times Sr)$$

$$Y_{Sc} = Y_P - (\cos(Ø_A + Ø_{ts}) \times Sr)$$

Returning now to FIG. 1, it can be seen that the engine 10 is at TDC and the piston 12 is located at the top of the cylinder 14. At this stage, the cylinder 14 contains a charge of compressed air/fuel mixture, which charge is ignited either by a sparking plug (not shown). Alternatively, if the Diesel engine principle is used, the cylinder 14 would contain a charge of compressed air which is at an elevated temperature due to compression, into which a charge of fuel oil is injected from an injector (not shown) and ignited.

Upon ignition of the charge, the explosion forces the piston 12 downwards, which in turn forces the connecting rod 16 downwards. The downward movement is transferred to the first roller 20 via the connecting rod 16 which movement can only be accommodated by the first roller 20 rolling over the surface of the lobe 30 of the primary cam 22 as shown by arrow P. This causes the cams 22, 26 and the output shaft 28 to rotate anticlockwise as indicated by arrow B.

Figure 2:
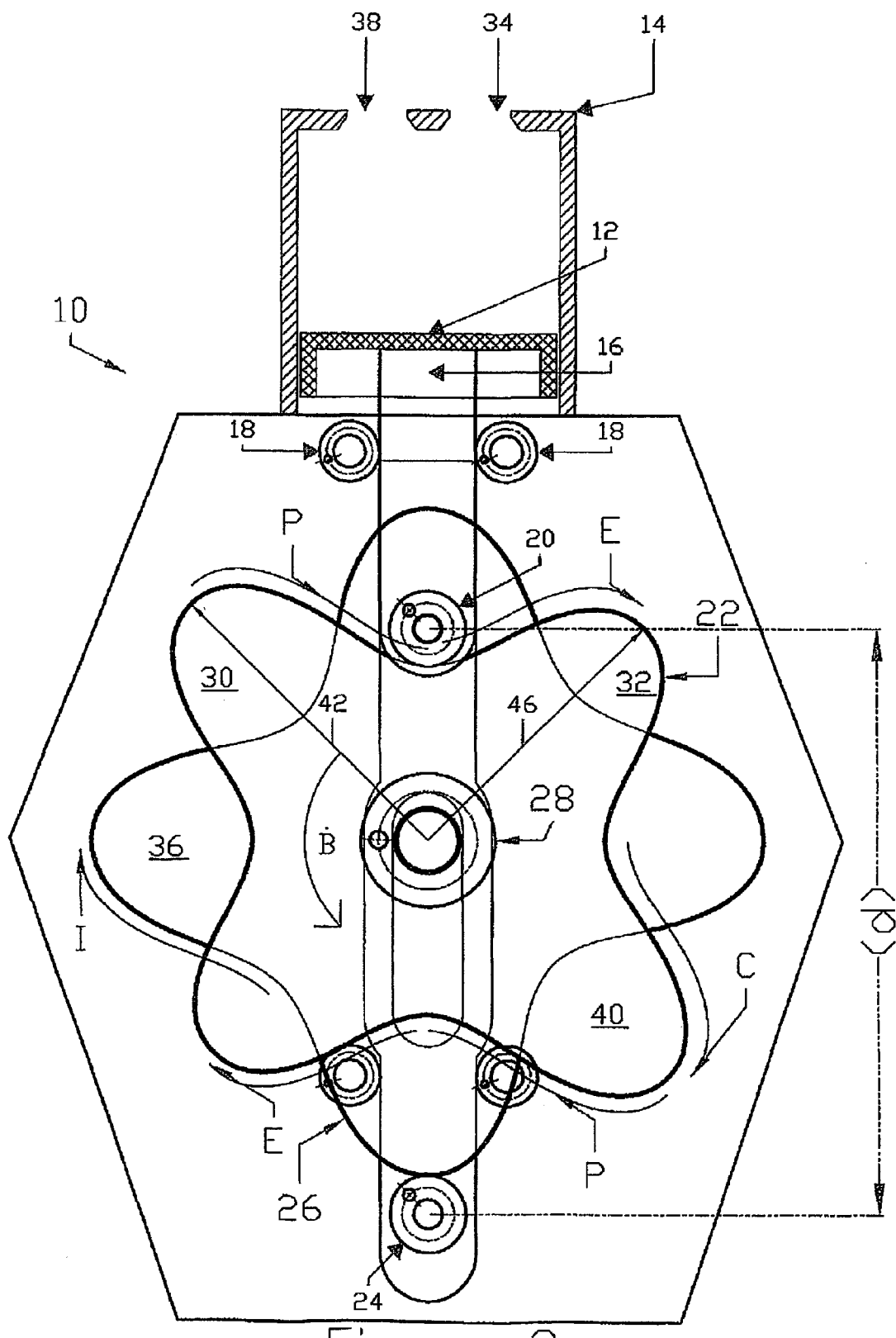
FIG. 2 is a schematic end view of the Atkinson cycle engine of FIG. 1 at bottom dead centre, prior to the exhaust stroke.

In FIG. 2, the shown engine is at BDC for the power stroke and the cams 22, 26 are moving anticlockwise. As the cams 22, 26 continue to rotate, the primary roller 22 begins to roll up the exhaust lobe 32 of the primary roller 22 as indicated by arrow E, which forces the piston 12 upwards in the exhaust stroke, which exhausts the combustion products from within the cylinder 14 via an outlet valve 34.

Figure 3:
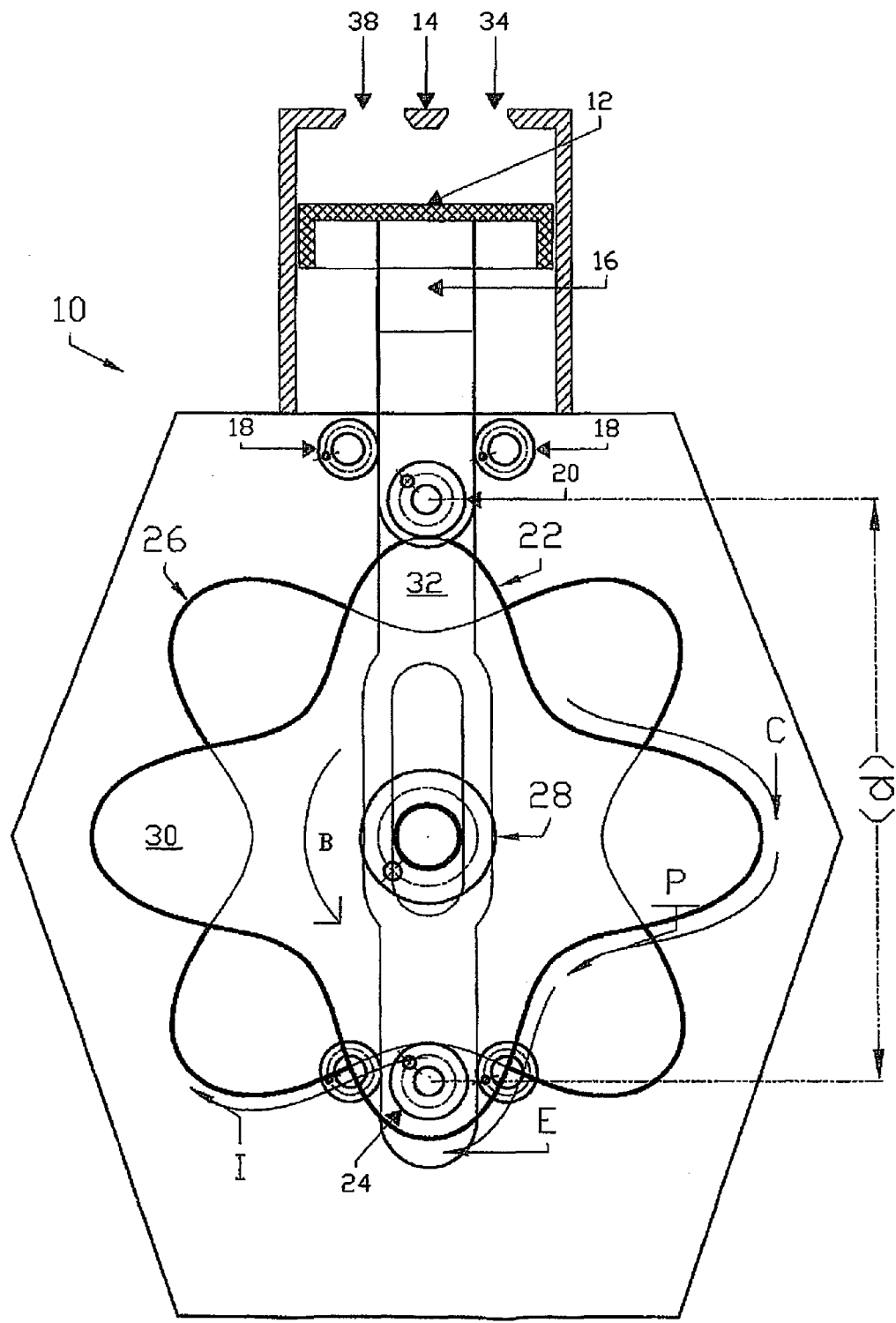
FIG. 3 is a schematic end view of the Atkinson cycle engine of FIG. 1 at top dead centre, prior to the intake stroke.

As the first roller 20 passes over the top of the exhaust lobe 32, as shown in FIG. 3, the piston 12 is pulled back down in the induction stroke by the action of the second roller 24 rolling up the induction lobe 36 of the secondary cam as indicated by arrow I. At the same time, fuel/air is draw into the cylinder via inlet port/injector 38. It will be noted that the piston does not reach TDC but instead, because the height of the induction lobe 36 is reduced as compared with the ignition lobe, the piston reaches a position short of TDC.

As the second roller 24 passes over the top of the induction lobe 36 of the secondary cam 26, the first roller 20 begins ascending the compression lobe 40 of the primary cam, as indicated by arrow C. This forces the piston 12 back up, thereby compressing the fuel/air mixture in the cylinder 14 ready for the next power stroke. The above cycle is repeated to produce continuous rotation of the output shaft 28.

As can be seen from FIGS. 1, 2 and 3, the height 42 of the lobe 22 of the primary cam 22 at TDC prior to the power stroke is larger than the height 46 of the lobe 46 at TDC prior to induction. Thus, the exhaust stroke is shorter than the compression stroke, meaning that the engine operates using an Atkinson cycle. However, if the cams 22, 26 are rotated on the output shaft 28 through ninety degrees, then the situation is reversed, i.e. the exhaust stroke becomes greater than the compression stroke and the engine 10 becomes supercharged.

Figure 4:
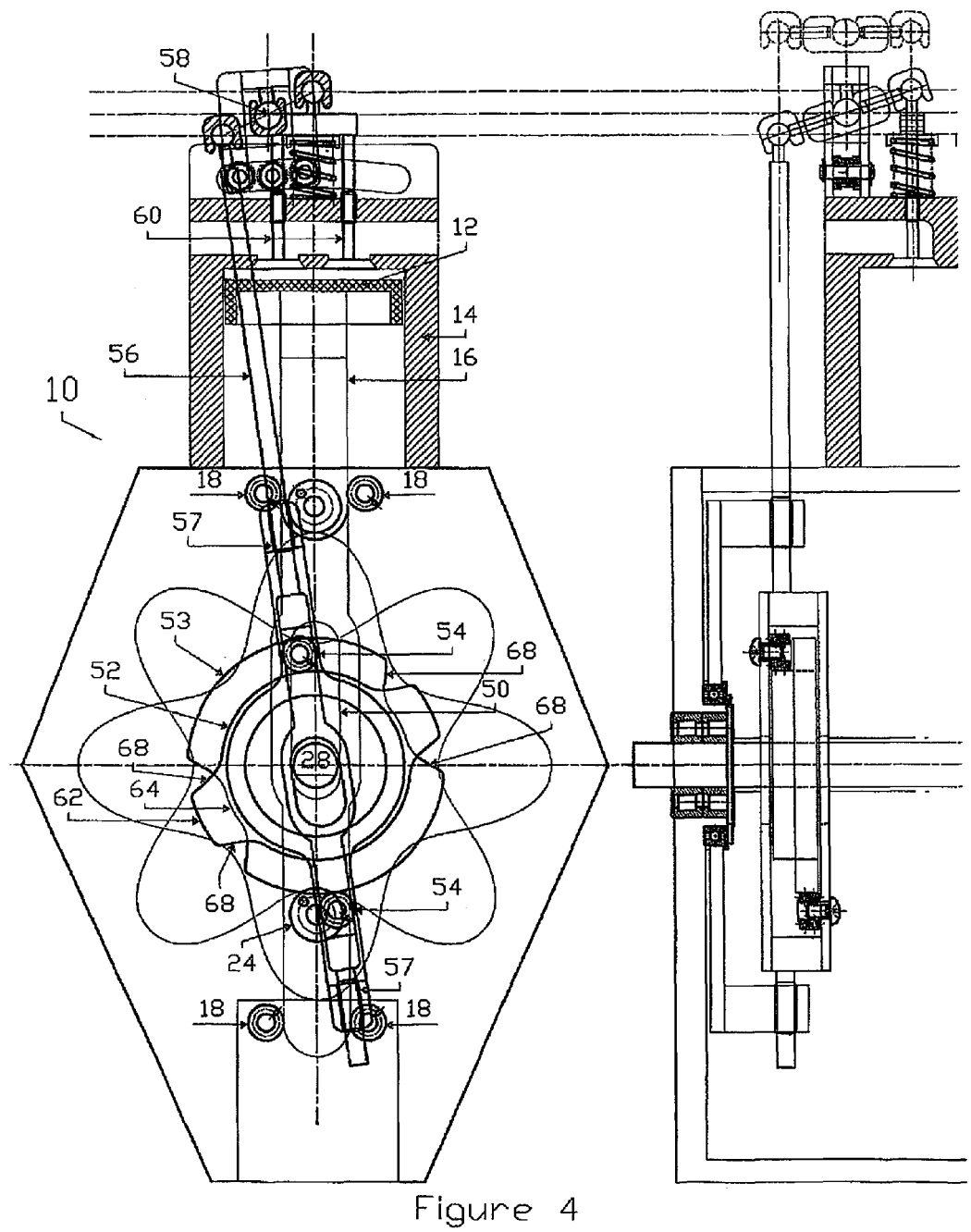
FIG. 4 is a schematic end view of a single-cylinder Otto cycle engine similar to that shown in FIGS. 1, 2 and 3 and additionally showing a schematic valve actuation mechanism.

FIG. 4 is a slightly more detailed schematic of the invention. In FIG. 4, it will be noted that the heights of the lobes 42 and 46 are equal, so the engine 10 operates using a conventional Otto cycle in which the compression and exhaust strokes are equal. The minor additional details shown in FIG. 4 are that the connecting rod 16 comprises an elongate slot 50 to enable the output shaft 28 to pass therethrough; and the addition of an extra set of guide rollers 18 located immediately below the lower roller 24 when the piston is at BDC, to further constrain and stabilise the connecting rod 16.

FIG. 4 additionally shows a primary 52 and a secondary exhaust valve cam 53 also rigidly connected to the output shaft 28. In practice, a pair of inlet valve cams (not shown) operating on the same principle as described below would also be provided, although it is not shown herein for reasons of clarity.

The outer edge of the primary exhaust valve cam 52 cooperates with a pair of valve cam followers 54, which are connected to a valve lever 56 via a rigid linkage 58, which operates the exhaust valve 60. The outer edge of the exhaust valve cam 52 is generally circular, but has a pair of diametrically opposed protrusions 62. The outer edge secondary exhaust valve cam 53 is also generally circular, but comprises a pair of diametrically opposed recesses 64. In operation, a first one of the cam followers 54 cooperates with the outer edge of the primary valve cam 52 and a second one of the cam followers cooperates with the outer edge of the secondary valve cam 53. As the valve cams 52, 53 rotate, the linkage 56, which is guided by the bushes 57, moves in a desmodromic fashion and hence operates the valve 60. It will be appreciated that the mode of conversion of rotary movement into reciprocating movement of the valve is similar to that the of the piston.

The protrusions 62 and recesses 64 are steeply stepped from the generally circular outer edge 66 of the exhaust valve cams 52, 53 by step portions 68. The profile of the step portions 68 is steep so that virtually instantaneous actuation of the valve 60 is possible. Moreover, since there are two valve cam followers 54, one of which is responsible for opening the valve 60 and the other of which is responsible for closing the valve 60, there is no need for the valve to be biased open or closed using springs, as is commonplace in the engine art, but instead is operated in a desmodromic manner. It will be appreciated that the valve timing can be adjusted by the careful selection of valve cam edge profile, and that the valve opening and closing times can be chosen by the careful selection of step portion 68 gradient: steeper gradients giving rise to shorter opening times and vice-versa. It thus becomes possible to precisely design the valve opening and closing characteristics of the engine, which can give rise to greater engine efficiencies and/or powers.

Figure 6:
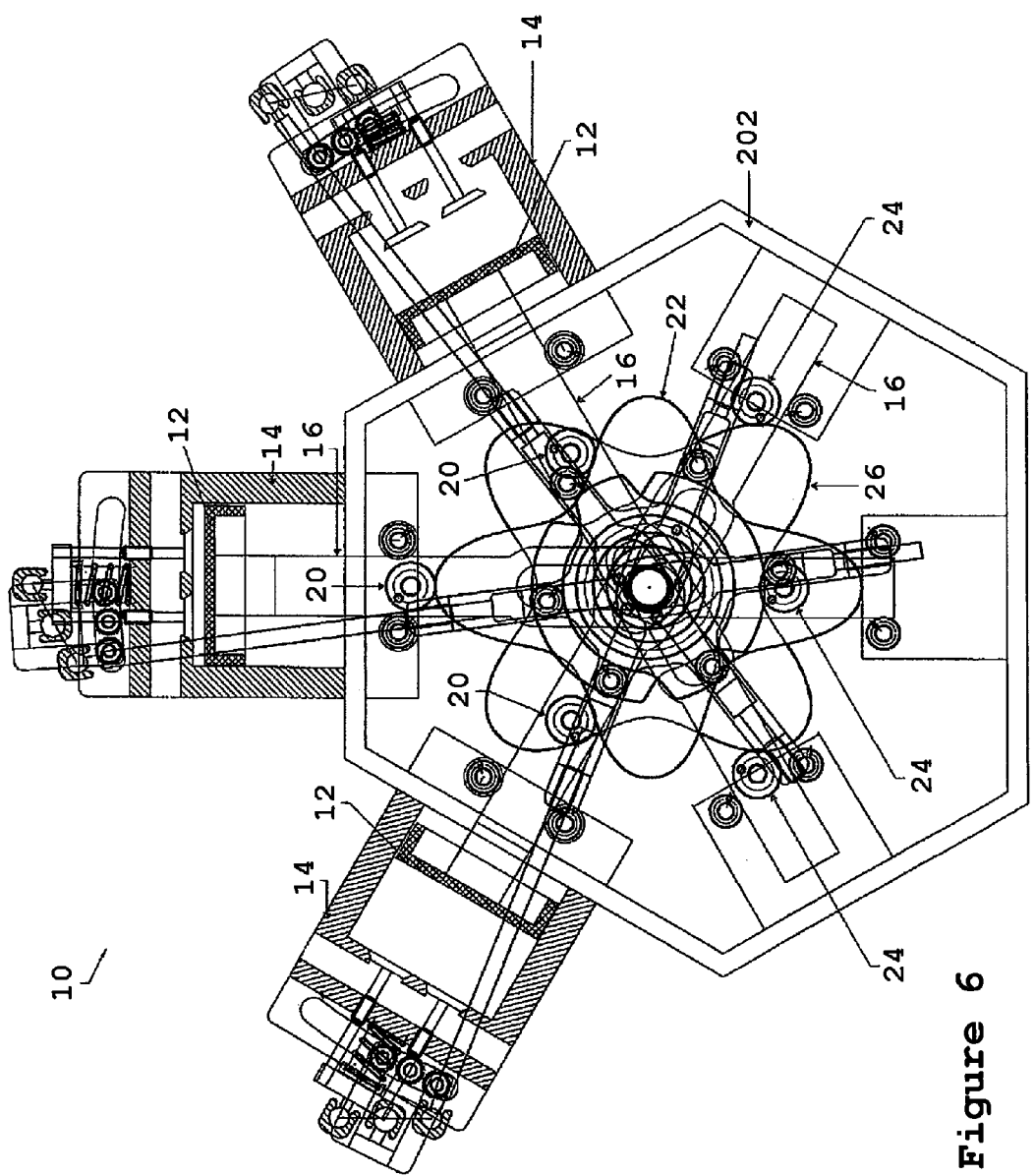
FIG. 6 is a schematic end view of a three-cylinder variant of the Atkinson cycle engine of FIG. 1.
Figure 7:
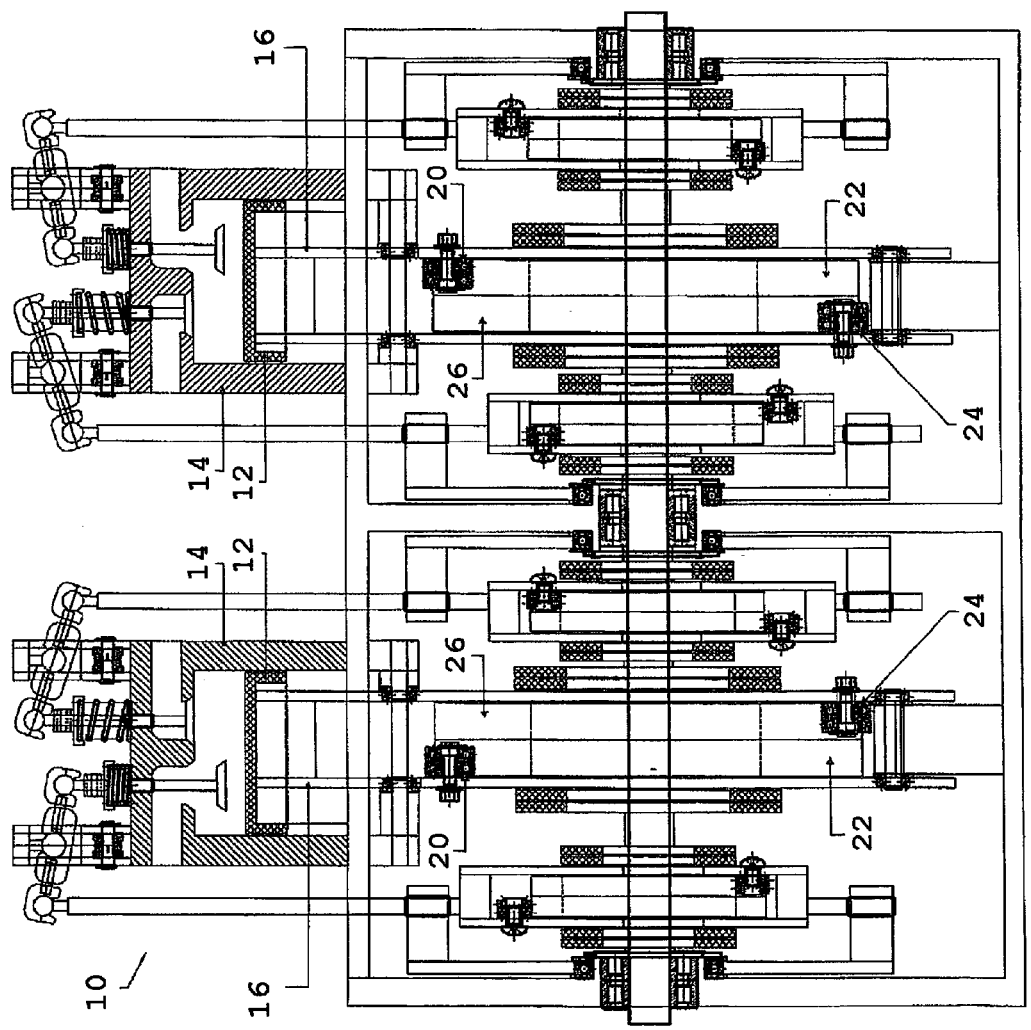
FIG. 7 is a schematic side view of a two-cylinder banked variant of the Atkinson cycle engine of FIG. 1.

In the foregoing embodiments, a single cylinder engine has been depicted. However, in FIG. 6, a three-cylinder engine according to the invention is shown comprising three connecting rods 16 arranged to act on common primary 22 and secondary cams 26. More, or fewer, than three cylinders per cam pair may be provided, and several "banks" of cylinders 14 could be multiplexed as shown in FIG. 7. By providing more cylinders and by arranging the cylinders to fire at different rotations of the output shaft, power can be delivered to the output shaft almost continuously thereby reducing vibration and delivering smooth power.

FIGS. 8 to 11 show embodiments of the invention that are similar to those previously described, except that each engine 11 comprises three pistons arranged at sixty degrees to one another and whose primary 20 and secondary rollers 24 engage shared primary 22 and secondary cams 26, respectively.

Figure 8:
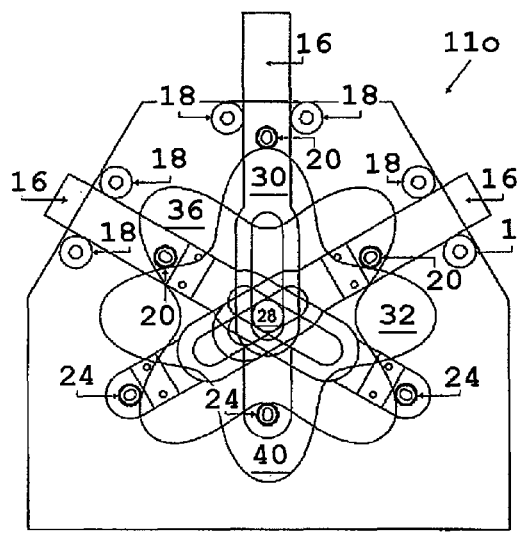
FIG. 8 is a schematic view, along the axis of the output shaft, of a three-piston Otto cycle engine according to the invention.

In FIG. 8, it can be seen that the primary cam lobes 30, 32, 40 are of equal height and that the shape of each cam lobe 30, 32, 40 is symmetrical about a line extending radially outwardly from the centre of the output shaft 28. Such a configuration gives rise, as previously explained, to a standard Otto cycle engine 11o in which piston displacement varies sinusoidally with the angle of output shaft 28 rotation.

Figure 9:
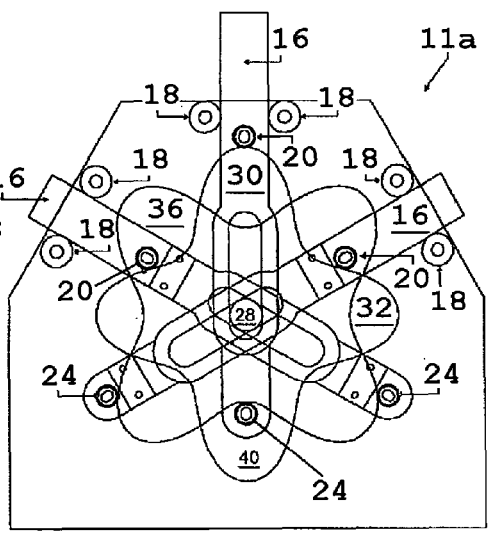
FIG. 9 is a schematic view, along the axis of the output shaft, of a three-piston Atkinson cycle engine according to the invention.
Figure 10:
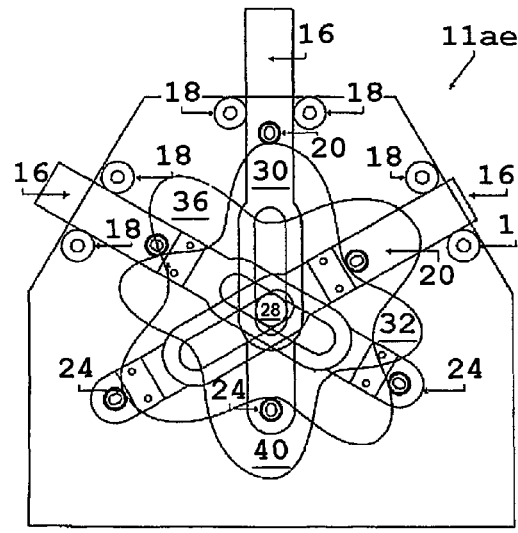
FIG. 10 is a schematic view, along the axis of the output shaft, of a three-piston Atkinson cycle engine configured for an extended power stroke according to the invention.
Figure 11:
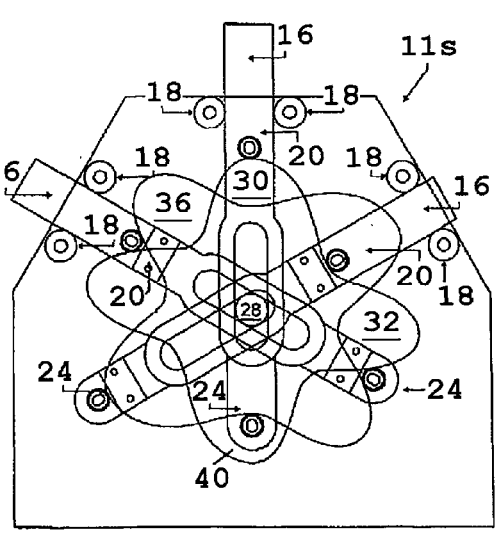
FIG. 11 is a schematic view, along the axis of the output shaft, of a three-piston supercharged engine configured for an extended power stroke according to the invention.

Similarly, FIGS. 9, 10 and 11 show how, by changing the relative heights of the lobes 30, 32, 40, the engine 11 can be converted to an Atkinson cycle, or a supercharged, engine.

Since the relationship between piston displacement and output shaft 28 rotation is defined by the primary 22 and secondary cam 26 shapes, it is possible, almost at will, to vary the engine cycle regime.

In FIG. 10, the Atkinson cycle engine 11ae of FIG. 9 has been modified such that the cam lobes 30, 32, 40 are no longer symmetrical about a line extending radially outwardly from the centre of the output shaft 28. In particular, it will be noted that the cam lobes are skewed such that the piston reaches its lowest point during the power stroke (BDC) at an output shaft rotation of approximately sixty degrees, as opposed to the forty-five-degree angle of an Otto cycle engine 11o. The effect of this is an "Extended Power Stroke" (EPS), whereby the power stroke is of extended duration, which allows the fuel more time to burn during the power stroke, thereby encouraging more complete combustion.

In addition, it can be seen that the gradient of the power lobe 30 is steeper prior to TDC 70 than after TDC 72, which gives rise to two effects, namely: more rapid compression; and more gradual expansion as the engine goes through TDC and the power stroke. These effects serve to increase the heating of the fuel/air mixture during the compression stroke and to delay the point where the primary roller 20 acts on the power lobe 30 of the primary cam 22 at forty-five degrees (the point where linear movement of the piston is most efficiently converted to rotational movement of the output shaft 28) to a point in time when combustion of the fuel/air mixture is properly underway. These two effects can give rise to marked improvements in fuel economy over and above the efficiency gains derived from the exhaust stroke length being shorter than that of the compression stroke.

In FIG. 11, the supercharged engine 11s comprises similarly asymmetric cam lobes 30, 32, 40 to those described above in relation to FIG. 10. In the supercharged engine 11s, however, the object is to obtain more power, rather than in the Atkinson cycle engine 11a, 11ae, in which the object is to optimise fuel economy. Cam lobe 30, 32, 40 asymmetry in the supercharged engine 11s is utilised to extend the power stroke (EPS) and to lengthen the time through which the piston acts on the cam 22 at, or near to, forty-five degrees. This, combined with a smoother transition between the end of the power stroke P and the start of the exhaust stroke E, enables the engine 11s to run more smoothly, and/or for longer, at higher speeds and torque loads, which can extend the life of certain types of high performance/racing engine.

Figure 12:
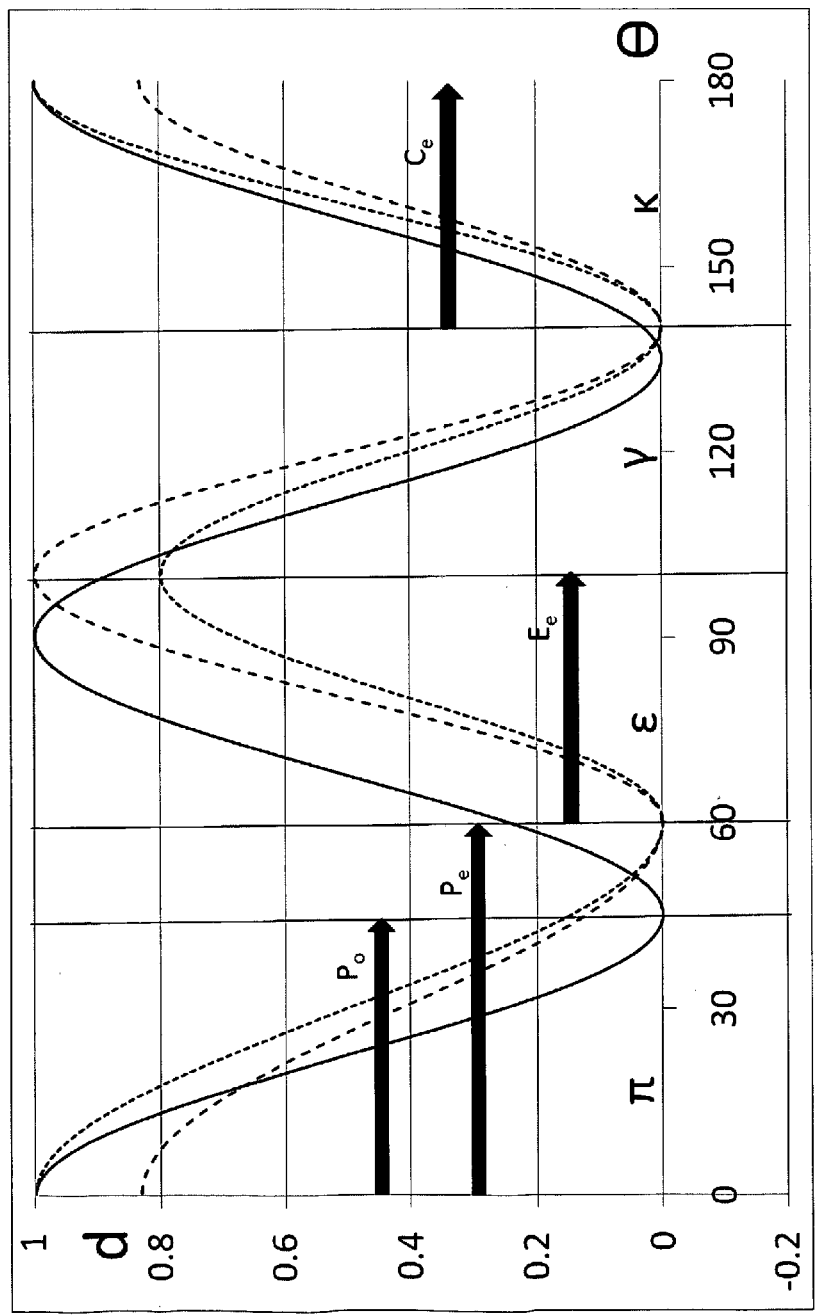
FIG. 12 is a series of superimposed schematic graphs of normalised piston displacement versus angle of output shaft rotation for the Otto cycle engine of FIG. 4, the Atkinson cycle engine configured for an extended power stroke of FIG. 10 and the supercharged engine configured for an extended power stroke of FIG. 11.

In FIG. 12, normalised piston displacements d are plotted against output shaft 28 rotation angle (in degrees) for the engines 11 illustrated in FIGS. 8, 10 and 11 above. The power stroke $\pi$, exhaust stroke $\epsilon$, induction stroke $\delta$, and compression stroke $\kappa$ are shown schematically. From FIG. 12, it can be seen how the power strokes Pe of the Atkinson cycle EPS (dotted line) 11*ae* and supercharged EPS (dash line) engines 11*s* have been extended through approximately sixty degrees of output shaft 28 rotation, as opposed to the forty-five degrees of the Otto cycle (solid line) engine 11*o*. However, the exhaust Ee and compression strokes Ce have been reduced to approximately thirty-five and forty degrees of output shaft 28 rotation, respectively, to compensate.

Having read the above, it will be apparent that, using an engine according to the invention, an engine designer can easily specify engine parameters, such as compression ratio, exhaust ratio, power stroke extension, compression stroke reduction, maximum piston displacement etc., plot those parameters on a graph similar to FIG. 12, draw a smooth curve between the points and then convert the graph to polar coordinates to render the primary cam edge shape. The secondary cam shape is, of course, geometrically related to the primary cam shape cam and can be easily derived therefrom. Thus, the invention affords the engine designer immense freedom to devise, design, and test engine regimes without introducing additional mechanical complexity. In fact, a stock engine according to the invention may be configured to receive different interchangeable sets of primary 22 and secondary cams 26, thereby enabling the engine 11 to be "tuned" to particular applications.

The engine 10 could be switchable between Atkinson and Supercharged by the addition of a mechanism that rotates the valve timing cams through ninety degrees relative to the output shaft and by changing the timing of the injectors to inject during the phase-changed stroke of the engine. In a petrol engine, this would entail swapping the timing of the injectors and sparking plugs. This could be accomplished using a switch or by programming the engine management computer appropriately.

An advantageous consequence of the Extended Power Stroke (EPS) described above, is the ability to lengthen the power strokes of multi-piston engines to a point whereby they overlap. Thus, an engine having three or more pistons and having power strokes power spaced at forty-five degrees or more of output shaft rotation, for example, could deliver continuous power and/or be potentially un-stallable. Such engines might be particularly suited to low-speed applications.

In the foregoing examples, it will be noted that the distance d between the first 20 and second rollers 24 is fixed. However, their positions relative to the connecting rod 16/cylinder 14 can be tailored to obtain different compression ratios. Thus, the engine can be easily "tuned" to run on different fuels by lengthening or shortening the connecting rod 16, thereby increasing or decreasing, respectively, the compression ratio.

The connecting rod 16 length could be varied using a lockable telescoping or screw-threaded element, thereby enabling the engine to be easily converted between "petrol" (gasoline), "diesel", "LPG", "biofuel" etc. modes. The lockable telescoping or screw-threaded element could be servo-controlled so that fuel type selection can be carried out by end users, e.g. using a dashboard control knob or via a graphical user interface of an engine management system.

In the foregoing embodiments, sets of rollers 18 are used to constrain the movement of the connecting rod 16, although a slider arrangement could also be used as an alternative means of constraining the movement of the connecting rod 16.

Figure 13:
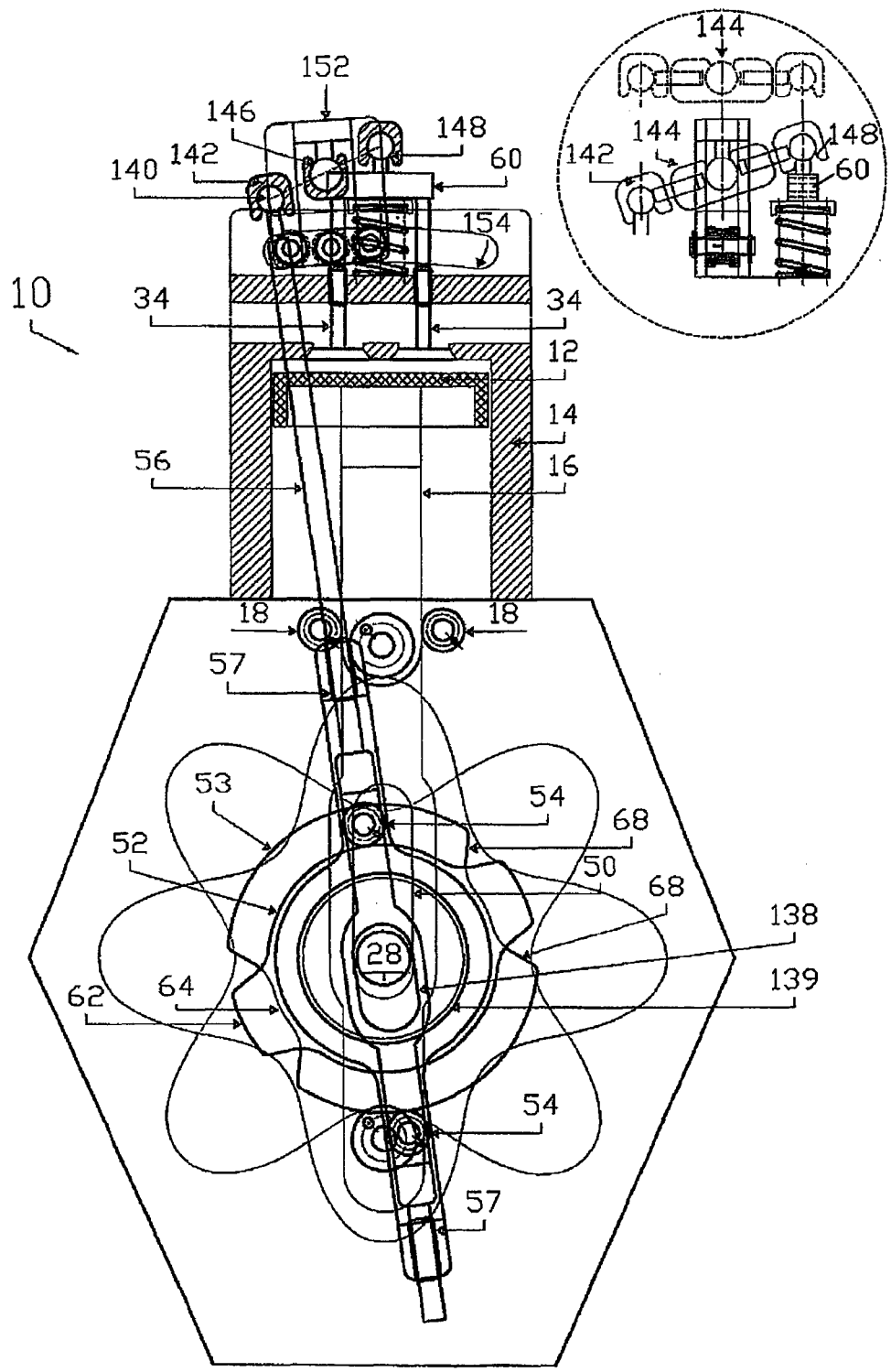
FIG. 13 is a schematic sectional view of an engine according to the invention looking along the axis of the engine's output shaft.

In FIG. 13, a crankless, cam engine 10 comprises a conventional cylinder 14 and a conventional piston 12 arranged to reciprocate within the cylinder 14. Reciprocating movement of the piston 12 is converted into rotational movement of an output shaft 28 by a pair of rollers 20, 24 engaging the lobes of primary 22 and secondary cams 26 that are rigidly affixed to the output shaft 28. The operation of a crankless, cam engine 10 is as described above. Because the four strokes of the engine cycle take place during a half revolution of the output shaft 28, it becomes possible to use a timing cam 52 rigidly affixed to the output shaft 28 to control the operation of the engine valves 34, 38 throughout the entire engine cycle.

In the illustrated embodiment of the invention, there are two timing cams 52, 53, which are rigidly affixed to the output shaft 28. The edge of the first timing cam 52, engages a first roller 54 and the edge of the second timing cam 53 engages the edge of a second roller 55. The first 52 and second timing cams 53 are complementarily shaped to enable both rollers 54, 55 to maintain continuous contact with the timing cams' edges, and hence operate the exhaust valves 34 desmodromically.

The first 52 and second rollers 53 are affixed to a rigid timing rod 56, which timing rod 56 comprises a slotted aperture 138 through which the output shaft 28 of the engine 10 passes. The slotted aperture 138 is sized so as to maintain the longitudinal axis of the timing rod 56 in a position where it perpendicularly intersects the longitudinal axis of the output shaft 28, but whilst enabling the timing rod 56 to slidingly reciprocate parallel to its own longitudinal axis. Thus, the timing rod 56 is able to move longitudinally parallel to its longitudinal axis, but is free to rotate about the axis of the engine's output shaft 28. It is constrained to move longitudinally by the timing rod guides 57.

Thus, with the timing rod 56 maintained at a fixed angle with respect to the engine's output shaft 28, it reciprocates as each of the timing rollers 54, 55 follows the timing cams' 52, 53 edge profiles. This inset of FIG. 13 shows the rocker arm in side view, which is shown in cross-section in the main Figure.

The timing rod 56 extends out of the crankcase such that its free end 138 is located at a position near to the engine's exhaust valves 34. The free end of the timing rod 56 carries a ball 140 which engages a socket 142 of a rocker arm 144. The rocker arm 144 is pivotally mounted near to its centre on a further ball and socket joint 146. The opposite end of the rocker arm 144 is connected via a yet further ball and socket joint 148 to a pushrod 60 that lifts and lowers the engine valve 34.

In use as the engine's output shaft 28 rotates, the timing rod 56 reciprocates parallel to its longitudinal axis, causing the rocker arm 144 to oscillate thereby opening and closing the valves 34, 38. The phase and duration of the opening and closing of the valves 34, 38 is determined by the timing cams' 52, 53 edge profiles and their rotational position relative to the engine's output shaft 28.

The rocker arm's pivot 146 is mounted on a support 152. The support 152 is supported on three ball bearings that are captured in an arcuate track 154 whose curvature is part-circular and centred on the engine's output shaft 28 axis. The support, and hence the rocker arm's pivot 146, is thus able to move along an arcuate locus defined by the track 154.

By moving the rocker arm's pivot 146 along the arcuate locus, the phase of the engine's timing can be adjusted. If the pivot 146 is moved in the same direction as the direction of rotation of the output shaft 28, then the valves will be actuated ahead of time, i.e. the timing is advanced. Conversely, if the pivot 146 is moved in the opposite direction to the direction of rotation of the output shaft 28, then the valve timing lags behind that of the piston, i.e. the timing is retarded.

The position of the engine's valves 34, 38 is fixed, but the timing rod end both reciprocates parallel to its longitudinal axis and swings on an arcuate locus centred on the rocker arm's pivot 146. The rocker arm 144 is therefore telescopically extendible to accommodate the constantly changing distance between: the timing rod end and the pivot 146; and the pivot 146 and the valve ball 148. Since, when viewed from above, the spatial relationship between the timing rod end and the pivot 146 is equivalent to the relationship between the pivot 146 and the valve ball 148, the rocker ratio is constant irrespective of the position of the timing rod end.

The support 152 or timing rod 56 can be connected to an actuator (not shown) so that the engine's valve timing can be adjusted as required using the actuator.

In one embodiment, the actuator comprises a cable (not shown) that operates in unison with the engine's throttle cable. Such a configuration may be particularly suited to a motorcycle engine whereby rotation of the throttle grip could also vary the engine's timing.

In another embodiment, the actuator is servo-controlled, which servo is controlled using an engine management computer.

Figure 14:
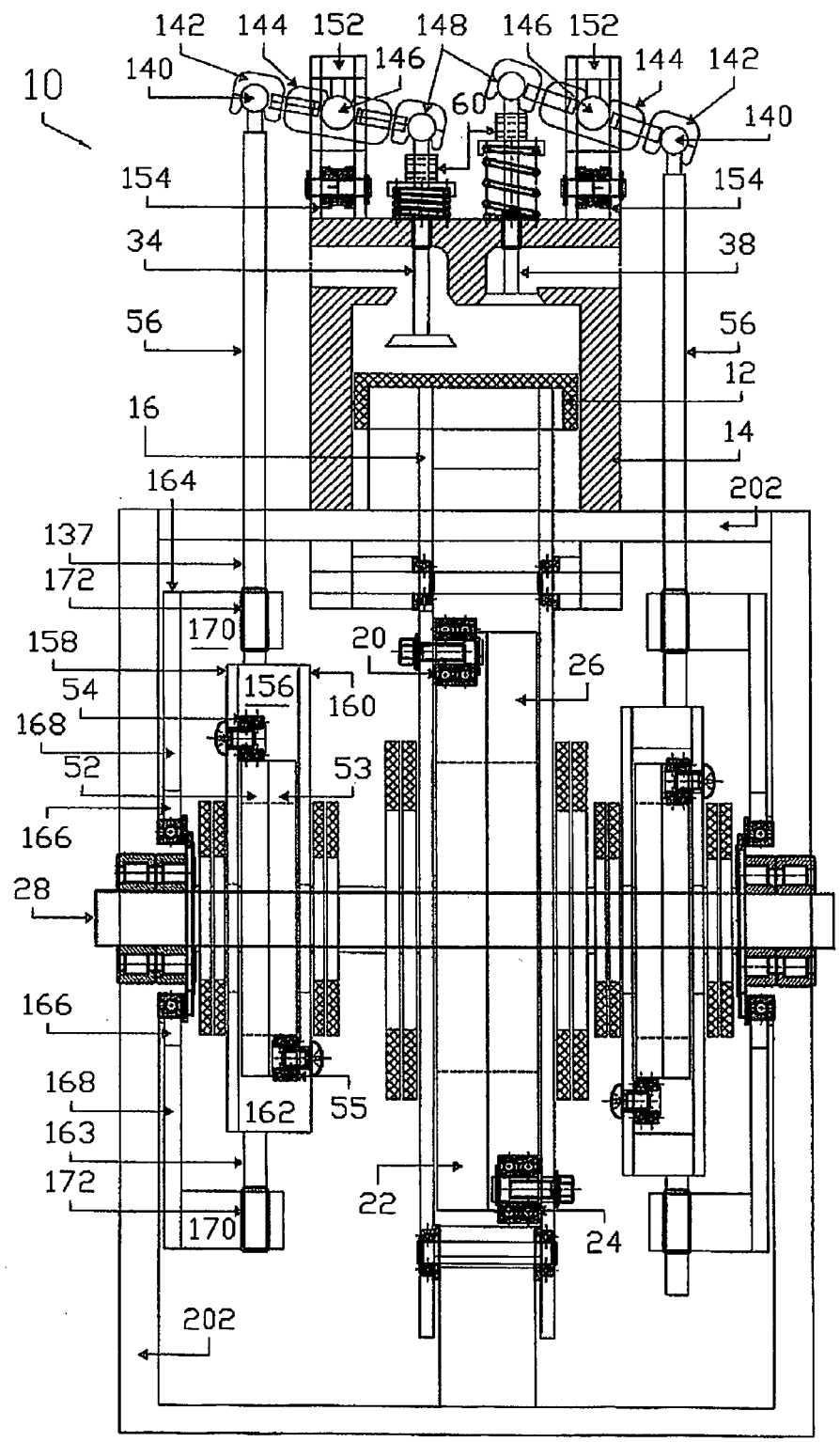
FIG. 14 is a schematic partial sectional side view of the engine of FIG. 13.

In FIG. 14 it can be seen that the timing rod 56 comprises an upper cylindrical portion 137 to which is affixed at its lower end, a spacer block 156 that is sandwiched between a pair of parallel, spaced-apart roller carrying plates 158, 160. The roller carrying plates 158, 160 are located on opposite sides of the timing cams 52, 53, which are positioned close to, or in mating contact with one another, on the output shaft 28 of the engine 10. The first roller 54 is rotatably mounted on the first carrier plate 158 and the second roller 55 is rotatably mounted on the second roller carrying plate 160. The lower ends of the roller carrying plates 58, 60 are connected to one another at a position below the timing cams 52, 53 by a second spacer block 162. Extending outwardly from the second spacer block is an extension rod 163 which is coaxial with the upper cylindrical portion 137.

To inhibit bending of the lower end of the timing rod assembly 56, a reinforcing member 164 is provided, which comprises an annular plate 166 to which a pair of radially extending support arms 168 are connected. The free ends of the support arms 168 carry support blocks 170 having bushes 172 through which the extension rod 163 and upper cylindrical portion 137 slidingly pass.

Figures 15, 16:
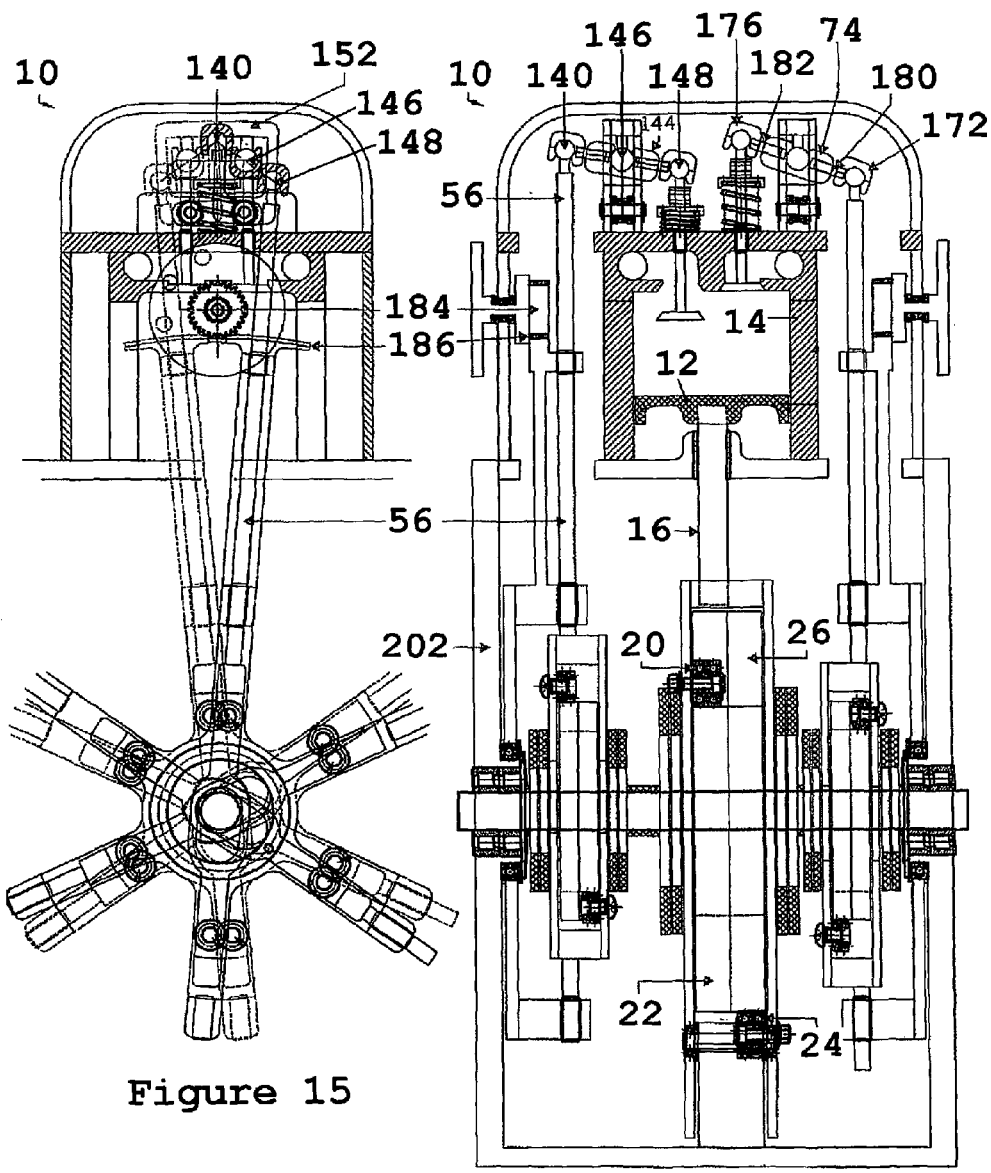
FIG. 15 is a schematic transverse section of a variant of the engine of FIGS. 13 and 14.
FIG. 16 is a close-up schematic partial longitudinal section of a variant of the engine of FIGS. 13 and 14.

FIG. 15 is an end view and FIG. 16 is a side view of a variant of the engine shown in FIGS. 13 and 14. Identical reference numerals are used to identify identical features in the respective drawings.

In FIGS. 15 and 16, it can be seen that the rocker arm 144 is supported by three ball and socket joints 140, 146, 148. The pivot joint 146 attaches to the rocker arm 144 from one side, whereas the other two joints 140, 148 attach to the rocker arm 144 from the opposite side. This configuration maintains the ball and socket joints in compression and maximises the contact area between the ball and socket to minimise wear and ease lubrication. It can also be seen in FIGS. 15 and 16 that the rocker arm 144 comprises five components, namely a timing rod socket 172, a pivot rocker 174 and a push rod socket 176. The timing rod socket 172 and pivot socket 174 slidingly engage a first shaft 180, and the pivot socket 174 and a push rod socket 176 slidingly engage a second shaft 182. This configuration enables the rocker arm 144 to expand or contract to accommodate length changes as it rotates and pivots in use whilst maintaining a constant rocker ratio.

The rocker arm's pivot 146 is mounted on a support 152 in the same manner as described above except that the support 152 is carried on a pinion gear 184 that rolls along an arcuate rack 186 whose curvature is part-circular and centred on the engine's output shaft 28 axis.

As can be best seen in FIG. 16, a separate valve timing mechanism is provided for the two induction valves and two exhaust valves.

Because the crankless, cam engine 10 requires just half of one complete rotation of the output shaft 28 per four-stroke cycle, the amount of advance or retardation is inherently four-times what would be achieved in a conventional engine for a given unit of displacement of the rocker arm pivot. Thus timing advances or retardations in excess of +/−40 degrees are, in principle, possible with the present invention as compared to the maximum known from the prior art of 21 degrees. Moreover, the amount of advance or delay can be selected in infinitely small increments between the maximum and minimum, as opposed to the prior art, which only provide step-changes. Particularly highlighted in FIG. 15 is the movement of the timing rod 56 between a far-left position (5 degrees left of centre) and a far-right position (five degrees right of centre), which respectively give rise to a 20-degree advance, or 20-degree retardation, of the timing.

Figure 17:
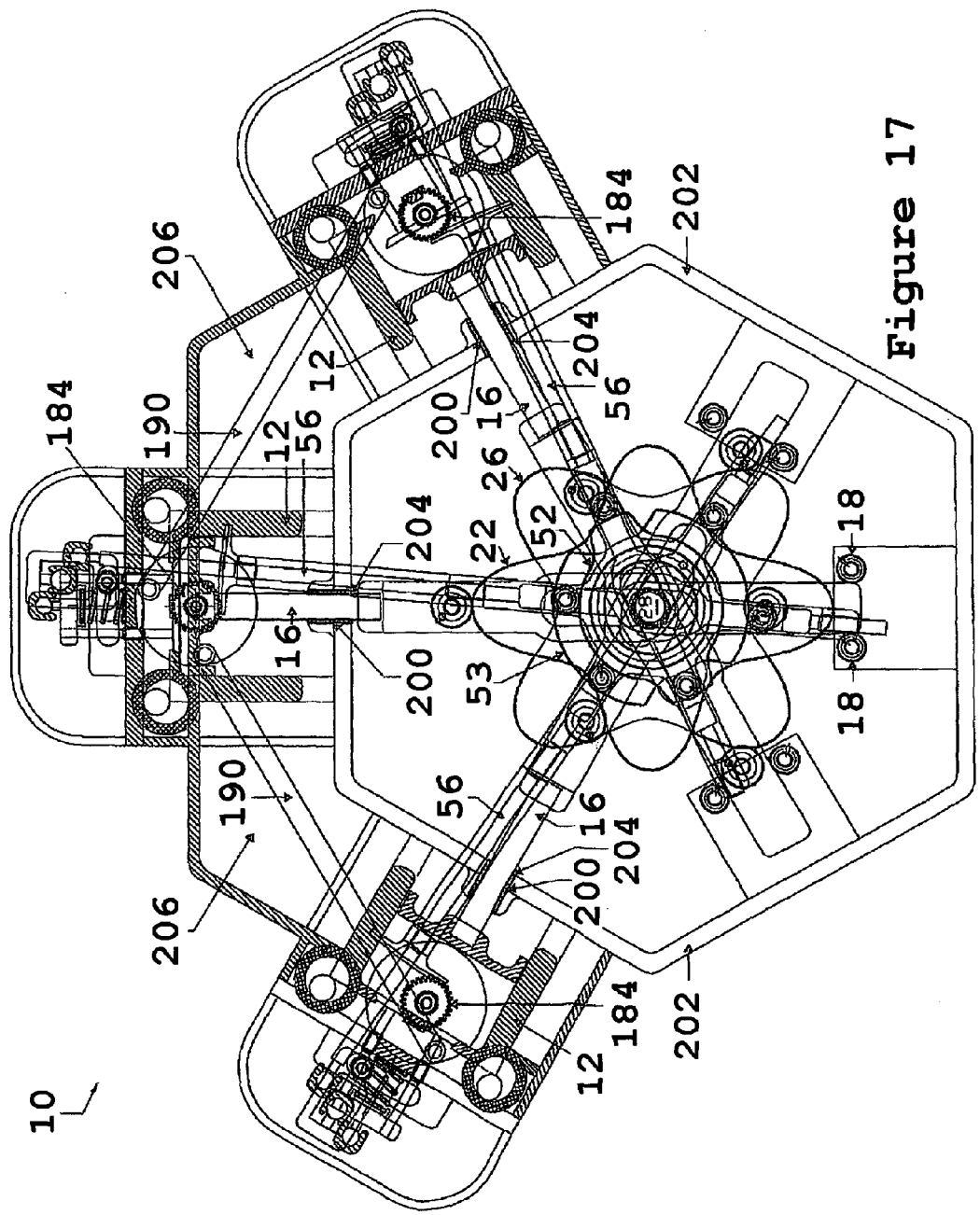
FIG. 17 is a schematic transverse sectional view of a three cylinder variant of the engine of FIGS. 15 and 16.

The engine 100 of FIG. 17 is a three-cylinder version of the engine shown in FIGS. 15 and 16. The three cylinders 12 are arranged at sixty-degree instances around the engine's output shaft 28. Each cylinder 12 has its own valve timing mechanism which mechanisms are driven by a common set of timing cams 52, 53. The timing advance or retardation is inputted using a single input, which input is transmitted to all of the rocker arm pivots via linkages 190 that rotate the pinion gears 184.

The connecting rods 16 of the invention are constrained to axially, which permits a minimum amount of clearance between the connecting rods 16 and the edges of the apertures 200 where they enter the crankcase 202. In the illustrated embodiment, a sealing bush 204 is used to seal the external face of the connecting rods to the internal edge of the crankcase apertures 200. Usefully, this arrangement enables the crankcase 202 to be sealed off from the pistons, which prevents combustion products from entering the crankcase 202. This arrangement has the advantage of reducing or preventing contamination of the crankcase lubricant (not shown) with combustion products from the engine. This has the potential for the crankcase to be "sealed for life".

However, in this arrangement, a quantity of air is effectively trapped between the underside of the piston and the crankcase wall. To avoid decreasing the efficiency of the engine by having to compress that volume of air in each downward stroke of the piston, a tube 206 is provided that provides a expansion chamber 206 between the cylinders of the engine. In use, as each piston moves downwards, air can move into the expansion chamber, which will be at a slightly reduced pressure due to at least one other piston being moving upwards at the same time. Thus, a neutral, or slightly negative air pressure can be maintained below each piston, in use. A slightly negative air pressure can also be advantageous as it discourages combustion products from entering the crankcase 202 and can reduce the air pressure within the crankcase 202 which in turn reduces "pumping losses" associated with having to move the cams 26 etc. through a viscous fluid, i.e. in air.

Figure 18:
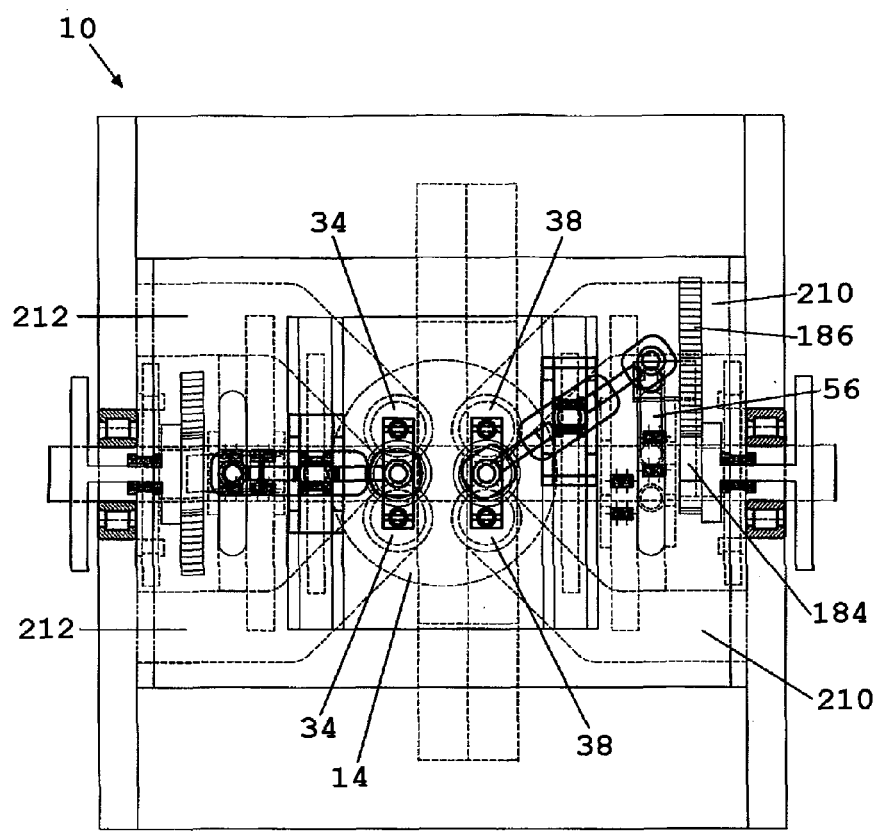
FIG. 18 is a schematic plan view of the upper portion of an internal combustion engine according to the invention.
Figure 19:
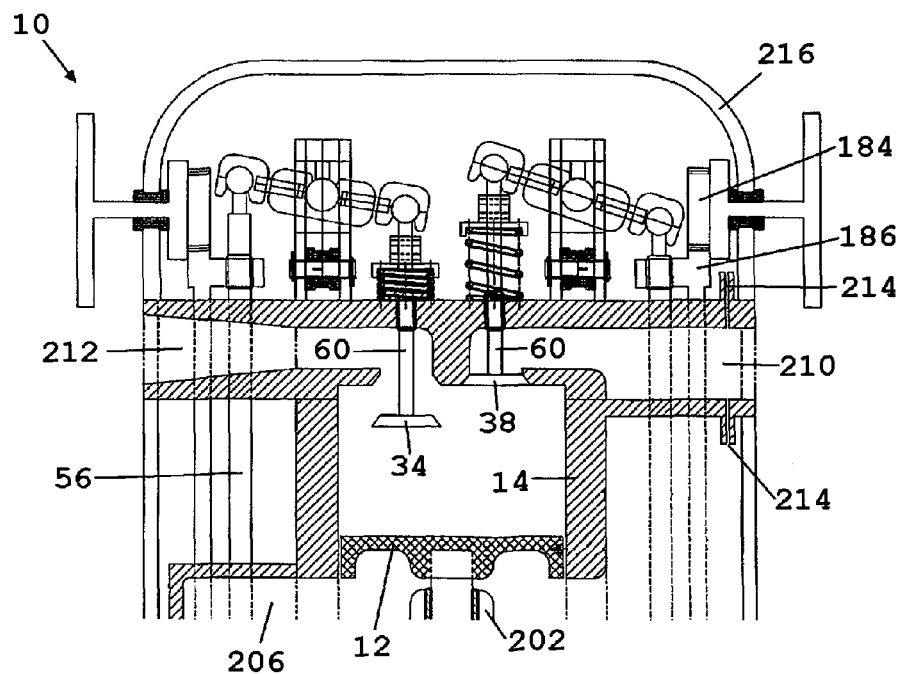
FIG. 19 is a schematic side view of the upper portion of an internal combustion engine according to the invention.

Finally, for the sake of clarity, FIG. 18 shows a sealed internal combustion engine according to the invention which has two inlet valves 38 and two outlet valves 34 arranged in a square when viewed from above. The inlet 210 and outlet manifolds 212 can also be seen. In the plan view of FIG. 18, the timing of the outlet valves 34 is set to zero advance, i.e. the timing rod is in a central position, whereas the timing of the inlet valves 38 is advanced. As can be seen in the right hand side of the drawing, the rocker arm has rotated and extended to accommodate the change in distance between the valve actuating pushrods 60 and the timing rod 56. The side view in FIG. 19 also shows the location and orientation of the expansion chamber 206.

Also shown in FIG. 18 is a crankcase breather tube 214 that enables the air pressure within the crankcase 202 and rocker case 216 to equalise with that of the inlet manifold 210. The pressure within the crankcase 202 and rocker case 216 is thus maintained at a slight vacuum that is equal to the average inlet manifold pressure. By operating the engine 10 at a reduced crankcase pressure, not only can pumping losses be reduced, but also the amount of air movement is reduced, which means that the volume of the expansion chamber 206 can be reduced. In addition, a reduced pressure draws any combustion products bypassing the piston rings to be re-circulated into the inlet manifold 210, which combustion products can then be burned off during subsequent power strokes of the engine 10.

Crucially, the internal cross-sectional areas of the breather tubes 214 are much smaller than the open cross-sectional area of the idling air control valve (not shown) so that the idling air control valve can maintain control over the engine's idling speed. It will also be noted that the breather tubes 214 are located downstream of the idling air control valves (not shown) so that any combustion products or lubricant mist from the crankcase 202 does not contaminate the idling air control valve.

The invention claimed is:

1. An internal combustion engine comprising:
a cylinder;
a piston reciprocally mounted within the cylinder;
a connecting rod extending from the piston; and
two spaced-apart rollers mounted on the connecting rod, wherein a first one of the rollers is adapted to engage an outer edge of a primary cam means and a second one of the rollers is adapted to engage an outer edge of a secondary cam means, the primary and secondary cam means being affixed to, and rotatable with, a common output shaft, wherein the first roller and the second roller are located on diametrically opposite sides of the output shaft, and the connecting rod comprises an elongated aperture, the output shaft passing through the aperture.

2. The internal combustion engine as claimed in claim 1, wherein the primary cam means is used for converting linear movement of the piston into rotational movement of the output shaft, and wherein the secondary cam means is used for converting rotational movement of the output shaft into linear movement of the piston, or vice-versa.

3. The internal combustion engine as claimed in claim 1, wherein the primary cam means comprises any one or more of the group comprising: an even number of lobes; four lobes; and an integer multiple of three lobes.

4. The internal combustion engine according to claim 1, wherein the geometry of the cam lobes is any one or more of the group comprising: asymmetric about a line extending radially outwardly from the centre of the output shaft; skewed such that the piston reaches bottom dead centre at an output shaft rotation of more than a quarter of the rotation of a complete four-stroke cycle, or at an output shaft rotation of more than one sixth of the rotation of a complete six-stroke cycle; and skewed such that the gradient of the power lobe is steeper prior to top dead centre than after top dead centre.

5. The internal combustion engine as claimed in claim 1, wherein the lobes are of substantially equal heights.

6. The internal combustion engine as claimed in claim 1, wherein the lobes are of unequal heights.

7. The internal combustion engine according to claim 6, wherein the lobe defining the power stroke is of a greater height than the height of the lobe defining the exhaust stroke.

8. The internal combustion engine, according to claim 6, wherein the lobe defining the exhaust stroke is of a greater height than the height of the lobe defining the power stroke.

9. The internal combustion engine as claimed in claim 1, wherein the connecting rod is constrained to move parallel to the axis of the cylinder.

10. The internal combustion engine according to claim 1, wherein the connecting rod converts reciprocating movement of the piston into rotational movement of an output shaft, and further comprising:
at least one valve for controlling the ingress and/or egress of a fluid into the cylinder, the valve being actuated by a linkage carrying a pair of cam followers cooperating with the surfaces of primary and secondary valve cam means which rotate with the output shaft, wherein the surface of the primary valve cam means comprises a generally circular portion and a pair of protrusions, and the surface of the secondary valve cam means comprises a generally circular portion and a pair of indentations, a first one of the cam followers cooperating with the surface of the primary valve cam means and a second one of the cam followers cooperating with the surface of the secondary valve cam means, which protrusions and indentations cause the valve to open or close respectively as the cam followers roll there over, characterized by a stepped transition between the generally circular portion and the protrusion and/or indention of the valve cams.

11. The internal combustion engine as claimed in claim 1, further comprising:
a plurality of pistons, cylinders and connecting rods cooperating with a common primary cam means and a common secondary cam means or a plurality of pistons, cylinders and connecting rods cooperating with a plurality of primary cam means and a plurality of secondary cam means, wherein the plurality of cylinders are arranged to fire at different rotations of the output shaft and wherein the power strokes of a first and a second piston's cycles overlap.

12. The internal combustion engine as claimed in claim 1, further comprising:
an aperture communicating with a crankcase and an inlet manifold of the engine.

13. The internal combustion engine as claimed in claim 12, wherein the aperture is located downstream of an idling air control valve of the engine.

14. The internal combustion engine according to claim 1 comprising a timing mechanism.

* * * * *